United States Patent [19]

Lindstrom

[11] Patent Number: 4,566,584

[45] Date of Patent: Jan. 28, 1986

[54] WEIGHING CONVEYOR

[75] Inventor: John W. Lindstrom, Newfield, N.Y.

[73] Assignee: Hi-Speed Checkweigher Co., Inc., Ithaca, N.Y.

[21] Appl. No.: 666,209

[22] Filed: Oct. 29, 1984

[51] Int. Cl.⁴ ............................................. G01G 11/00
[52] U.S. Cl. .................................... 198/504; 198/626; 177/145
[58] Field of Search ............... 198/504, 505, 680, 626; 177/145; 209/592, 593, 645

[56] References Cited

U.S. PATENT DOCUMENTS

| | | | |
|---|---|---|---|
| 2,429,864 | 10/1947 | Alvord | 198/505 X |
| 2,938,626 | 5/1960 | Dahms | 198/505 X |
| 3,070,214 | 12/1962 | Del Rosso | 198/504 |
| 3,622,000 | 11/1971 | McClenny | 198/505 X |
| 3,706,369 | 12/1972 | Ishida et al. | 198/626 X |
| 3,955,665 | 5/1976 | Pettis, Jr. et al. | 198/505 |
| 4,122,940 | 10/1978 | Hoffmann | 198/504 |
| 4,143,727 | 3/1979 | Jacobson | 177/229 X |
| 4,146,100 | 3/1979 | Jacobson et al. | 177/211 |
| 4,163,488 | 8/1979 | Brook | 198/504 |

Primary Examiner—Joseph E. Valenza
Assistant Examiner—Jonathan D. Holmes
Attorney, Agent, or Firm—Bean, Kauffman & Bean

[57] ABSTRACT

An improved motorized, articles-in-succession conveying and weighing (or checkweighing) machine for use such as intermediate of in-line article feeding and take-away conveyors, or the like, comprises essentially a frame-like support structure; a strain gage load cell suspended therefrom, which carries suspended therefrom a cage-like bracket, the opposite sides of which support spaced apart parallel article transport conveyors. Each of such conveyors comprises an endless belt training about driving and idler rollers which rotate about vertical axes. These conveyors define therebetween an article-to-be-weighed conveying passageway extending in longitudinal alignment with article feeding and take-away conveyor. The motor driving the conveyors is also mounted on the bracket suspended from the load cell; and therefore the motor and the conveyor form parts of the tare load on the load cell. The driving motor is positioned on the bracket at an elevation above that of the load cell and in counterbalance of any tendency of the bracket cage to rotate about the horizontal axis of the load cell such as may be induced by intermittent or variable forces acting upon the article conveying component of the machine which is suspended below the load cell.

17 Claims, 10 Drawing Figures

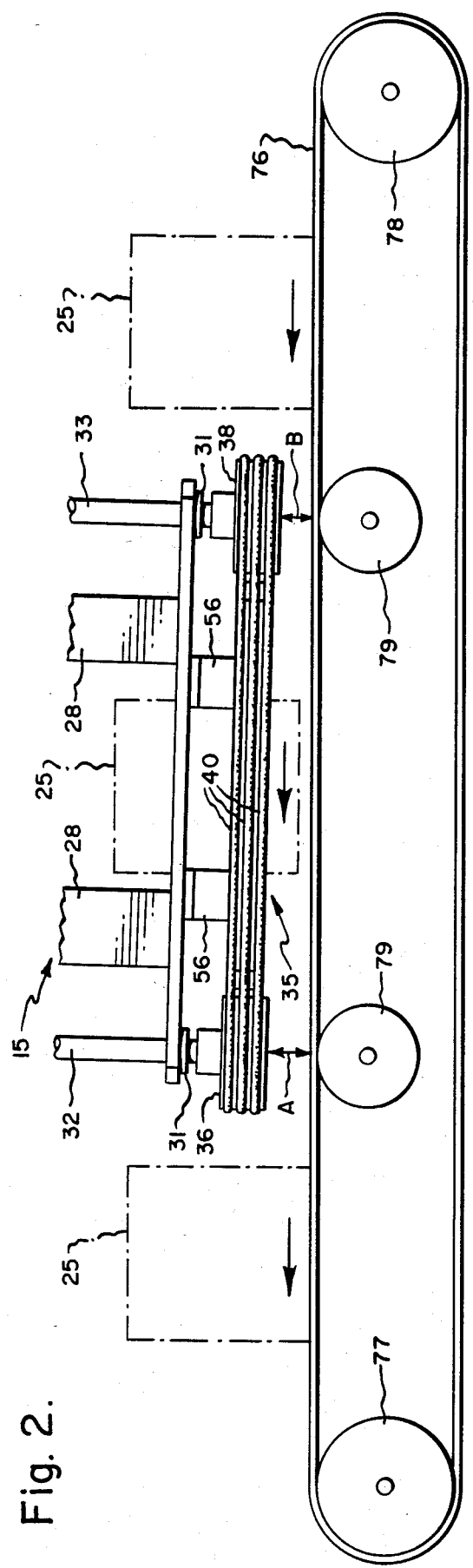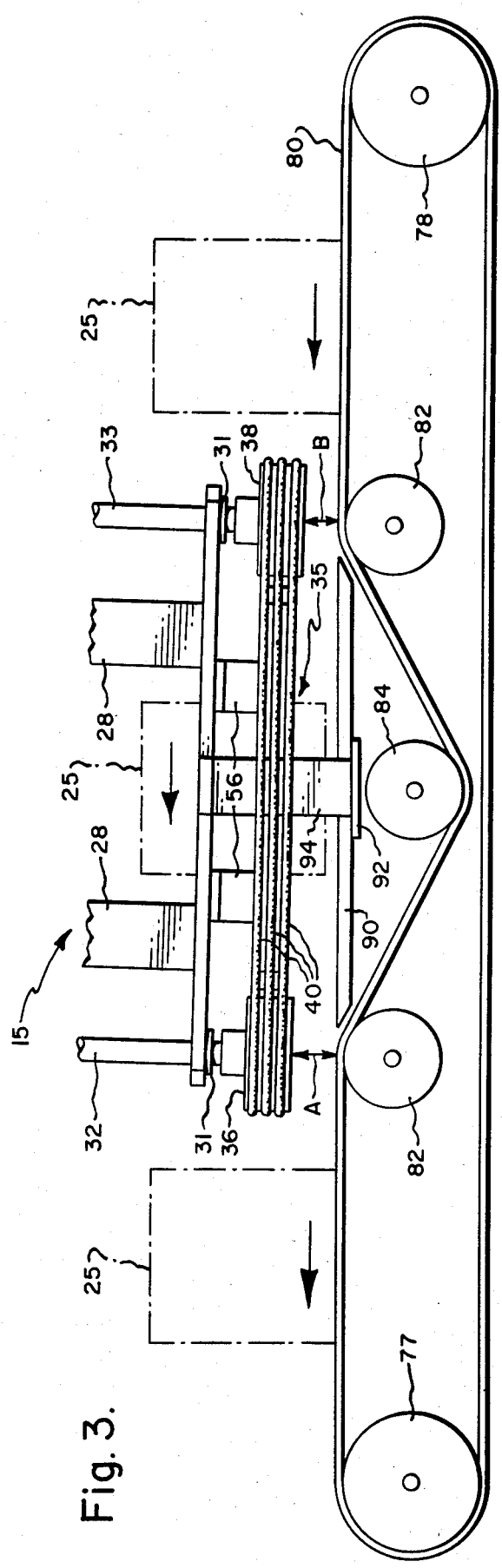

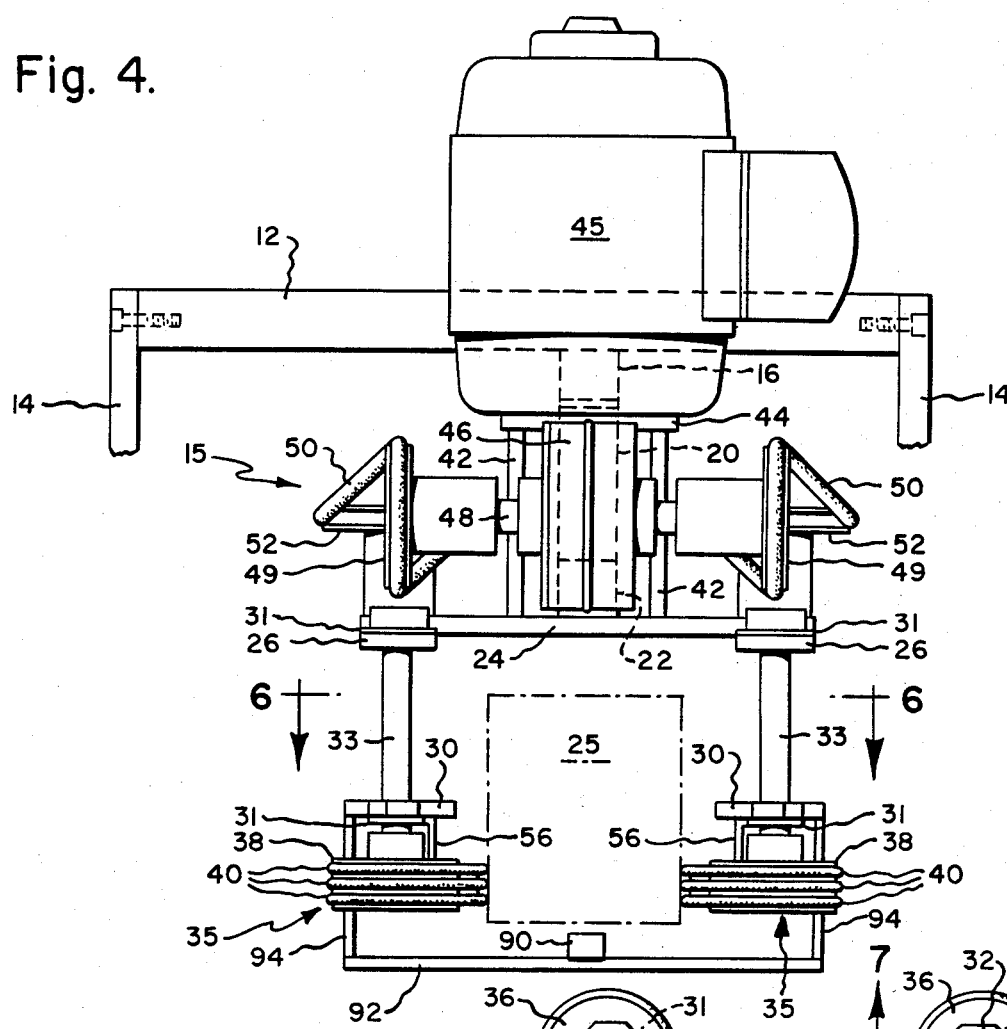
Fig. 4.
Fig. 5.
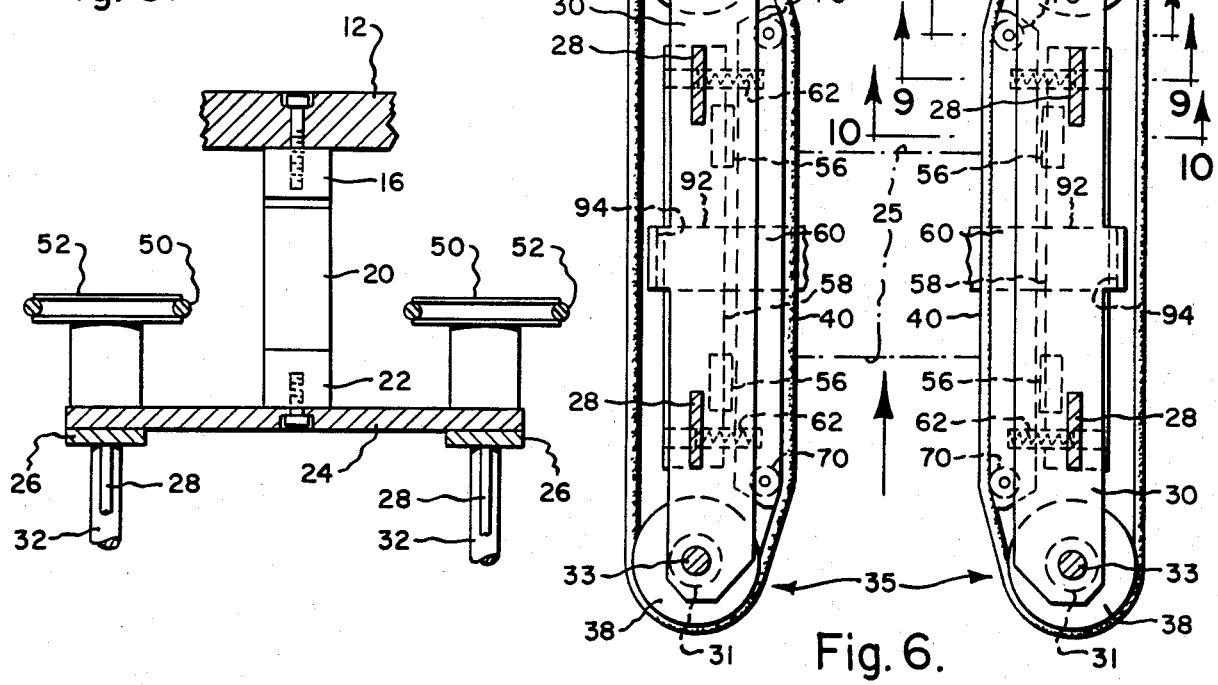
Fig. 6.

WEIGHING CONVEYOR

BACKGROUND OF THE INVENTION

This invention relates to high speed operating weighing/conveyor machines such as are used in the food and other commodity packaging/weighing/checkweighing industries or the like. Prior machines for such purposes are disclosed for example in U.S. Pat. Nos. 2,838,176; 3,070,214; 3,180,475; 3,955,665 and 4,114,707.

Thus, the invention relates to so-called powered transient platform scales, such as are used in systems for weighing discrete articles being conveyed in succession at high speeds over a weighing device; the weights of which in most cases are to be visually displayed and graphically recorded. Also, in some cases such measurements are used to control devices for rejection from the delivery line of underloaded or overloaded packages or containers, as is well known in the art.

Machines for such purposes have heretofore comprised vertically "stacked" structural assemblies, at the bases of which reside the load cell or other weight-measuring component thereof which is surmounted by the article transport weighing conveyor and which is driven by an externally based motor and power drive system. Such assemblies are accordingly inherently "top-heavy", and therefore are subject to magnification of unbalancing forces such as are typically incident to the overall operation, and which when transmitted to the article weight detecting mechanism result in inaccurate weight measurement reports.

BRIEF SUMMARY OF THE INVENTION

This invention provides means whereby to provide a more accurate weight reporting system of increased capacity. This is accomplished by integrating and locating the requisite tare weight components thereof such as include the conveyor carrying the items to be weighed; its power supply motor and transmission system and the supportive structures, into a cage-like cradle assembly which is structured so as to be per se substantially balanced about the horizontal axis of the load cell. Furthermore, the article conveying component of the machine of the invention is of improved design whereby to provide for smoother transfers of the articles being weighed from the delivery device into and throughout the weighing operation, and then on to the take-away conveyor.

The invention features a unique conveying system comprising a pair of spaced apart parallel endless belt type conveyors running about vertical axes which receive and frictionally grip and carry along in vertically suspended relation therebetween such articles as are fed thereto in succession; incidental to which the load cell operates to signal to the attendant weight-registering equipment the individual weights of each article so transported. Therefore, the machine of the invention is capable of operating at higher speeds, and therefore higher capacities, compared to machines previously available to the industry, while correctly reporting the net weights of articles being processed.

BRIEF DESCRIPTION OF THE DRAWINGS

FIGS. 2 and 3 correspond to FIG. 1, but show different forms of article delivery and take-away conveyor arrangements;

FIG. 4 is an end elevational view taken as along line 4—4 of FIG. 1;

FIG. 5 is a fragmentary sectional view taken as along line 5—5 of FIG. 1;

FIG. 6 is a sectional view taken as along line 6—6 of FIG. 4; and

DESCRIPTION OF THE PREFERRED EMBODIMENT

Figure 1:
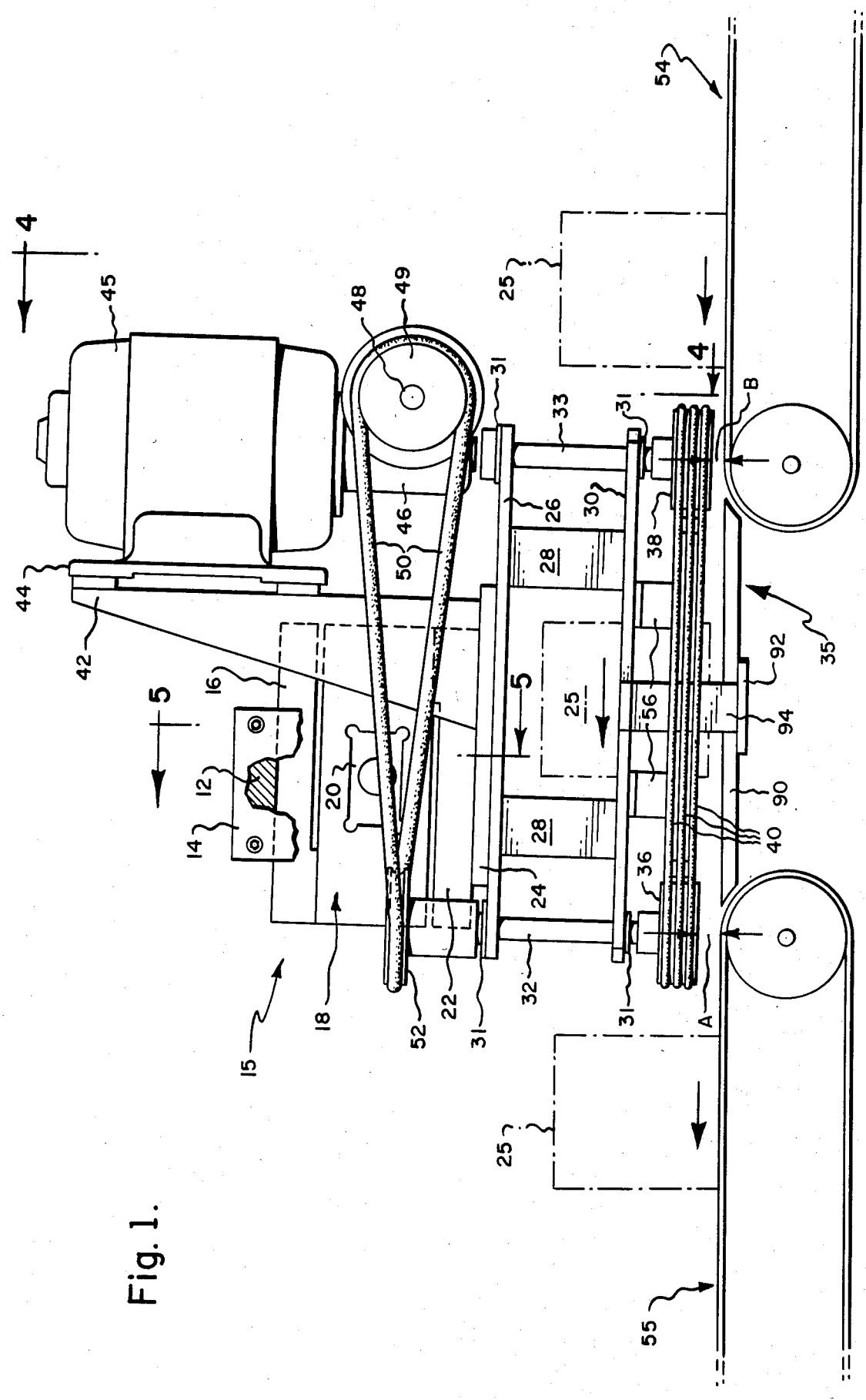
FIG. 1 is a side elevational view, showing a machine of the invention as being employed in association with one form of article delivery and take-away conveyor system.
Figure 7:
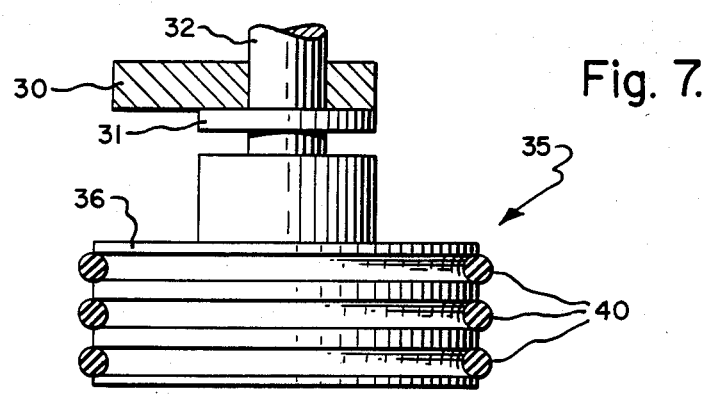
FIGS. 7, 8, 9 and 10 are fragmentary sectional views on enlarged scale taken as along lines 7—7; 8—8; 9—9 and 10—10, respectively, of FIG. 6.

The drawing herewith illustrates a typical high speed operating weighing or checkweighing/conveying machine incorporating the preferred form of the present invention. Machines of this type are adapted to accommodate fleetingly received and discharged successions of discrete articles and to report by way of an auxiliary attendant analogue-digital converter the price per pound/weight and total cost of each such article to visual and/or tape recording devices. However, employment of such devices is only incidental to the present invention.

As shown at FIGS. 1 and 4, the machine may by way of example be suspended from an overhead beam 12 such as may be supported by vertically standing legs or posts 14, so as to straddle the machine per se which is designated generally by the numeral 15. The machine is hung from the beam 12 by bolted attachments or the like to the uppermost beam component 16 of such as a weight-measuring transducer device which is preferably of the "leverless type" load cell or the like such as is designated generally by the numeral 18. Such load cells are currently available on the market and are structured and operate as explained for example in U.S. Pat. Nos. 4,143,727 and 4,146,100. In this case, the intermediate article weighing strain gage component of the unit 18 is designated by the numeral 20, and the lower beam component of the transducer is designated by the numeral 22. The lower beam 22 is bolted or otherwise fixed to a cross-plate 24 which transversely spans the articles-to-be-weighed passageway through the weighing/checkweighing machine, such articles being illustrated at 25.

At opposite ends of the transverse plate 24, it has affixed thereto a pair of upper stringer bars 26,26 which extend in parallel relation above and at opposite sides of and alongside the pathway through the machine for articles to be weighed. Struts 28 rigidly depend from each of the bars 26,26, and are affixed at their lower ends to corresponding lower stringer bars 30,30; thereby providing a rigid truss structure of inverted U-shaped sectional form hanging below the transverse plate 24. At their opposite ends, each pair of stringer plates 26,30 rotatably mount by means of bearing housings 31 in vertically standing attitudes therebetween, a pair of longitudinally spaced apart spindles 32,33. Each such paired spindles carry at their bottom ends pulley devices about which elastic article conveying endless belt means train, as shown generally at 35,35. Thus, each belt system comprises a multiply-grooved power-driven pulley and an idler pulley (as shown at 36,36 and 38,38 respectively), which are keyed to the lower ends of the spindles and about which may train by way of preferred example a complementary number of lengthwise elastic "O" ring type endless belts 40.

The drive system for the article conveying device is mounted upon the transverse plate 24 at an elevation above the load cell 18, and comprises a pair of vertically extending brackets 42,42 (FIGS. 1 and 4) which carry therebetween a support plate 44 upon which the machine drive motor 45 is mounted. The motor output shaft and speed reduction gear assembly is shown at 46 and delivers power by means of a transversely directed shaft 48 at opposite ends of which are keyed drive pulleys 49,49, which are thereby positioned in alignment (by means of endless belts 50,50) with opposite end pulleys 52,52 which are keyed to and power their respective conveyor drive pulleys 36,36.

A conveying belt guide track device is provided to extend longitudinally in between the drive and idler pulleys 36,38 of each conveyor unit 35 at opposite sides of the article passageway through the machine. This is to insure that the inboard runs of the belts 40 constantly press against opposite sides of the articles being processed throughout their travels through the weighing machine. Such articles are thereby frictionally "picked up" and conveyed and so vertically supported as to enable the article weighing mechanism to add to the tare weight of the mechanism accurate readouts of the weight of each article as it is being processed.

Figure 9:
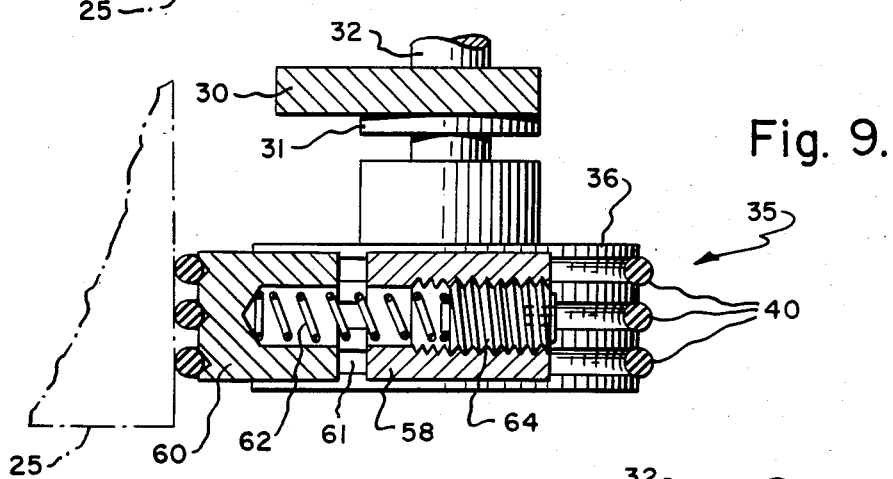
Figure 10:
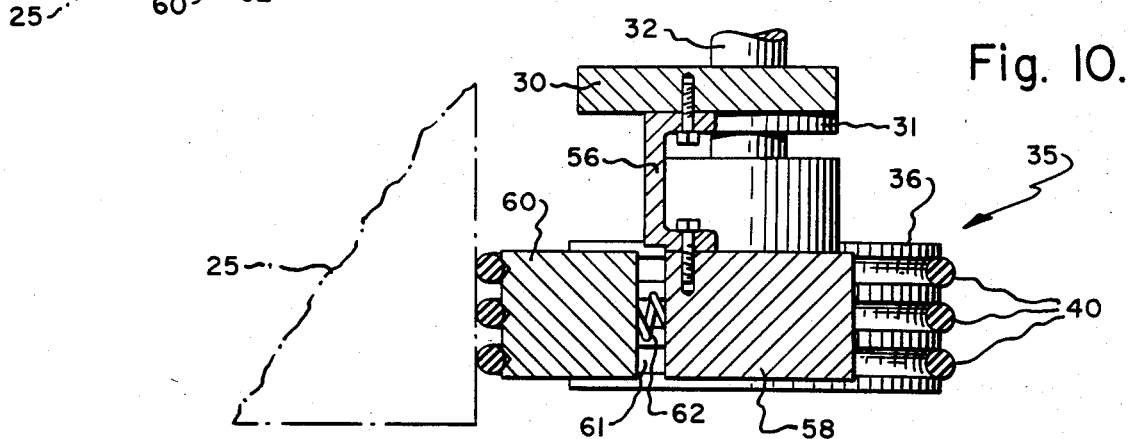

For example, a conveyor belt backup mechanism for the inboard runs of the conveyor belts 40 is shown as being suspended by channel-sectioned brackets 56,56 (FIG. 10) below each of the stringer bars 30,30. Each of the backup mechanisms comprises a stationary backlog member 58 and a conveyor belt slide shoe member 60 which in turn is slidably carried by means of a complementary keyway 61 (FIGS. 9 and 10) so as to be inwardly/outwardly positionally adjustable relative to the article passageway through the machine. Compression springs 62 housed in bore holes formed in the members 58 and 60 operate to bias the shoes 60 inwardly towards the article passageway; and set screws 64 (FIG. 9) are provided for adjustments of the spring pressures. The shoes 60 are preferably longitudinally grooved as shown at FIGS. 9 and 10 to provide guide tracks for the belts 40; and thus it will be appreciated that the shoes 60 are adapted to maintain pressures of the inboard runs of the belts 40 in sidewise opposition against articles passing through the machine.

Figure 8:
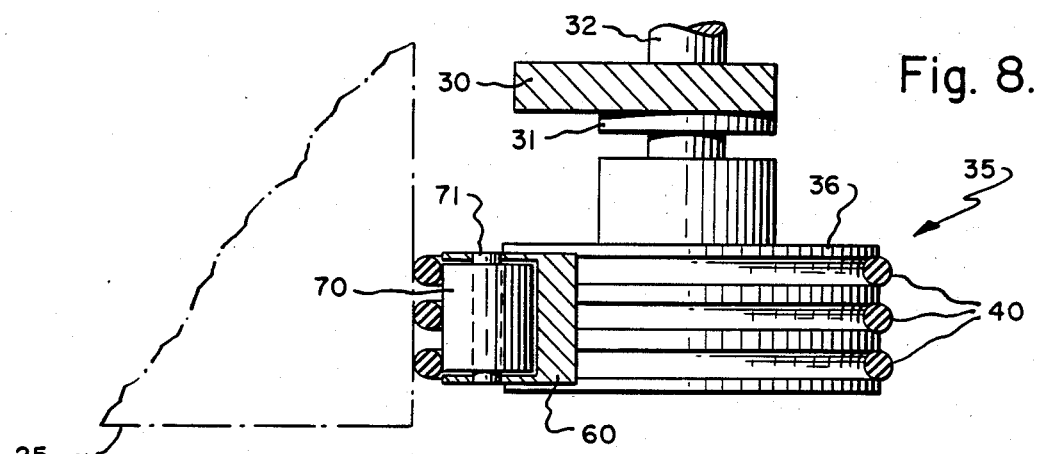

In order to adapt the shoes 60,60 to suitably backup their belt runs while at the same time facilitating adjustments thereof to accommodate articles of different widths, each shoe 60 is preferably provided at its opposite ends with inlet and outlet belt guide rollers such as are shown at 70. As best shown at FIG. 8, such rollers may be conveniently mounted by means of vertical axles 71 which freely rotate upon the corresponding shoe members 60. The belt members are formed of any suitable lengthwise elastic and non-slide surfaced type material; such as may be of any of the currently available "elastomeric" rubber and/or synthetic "plastic" materials. Or, such belts may be of a composite construction, such as may each comprise an elastic "core" which is covered either by a coating or by a sleeve of friction type material. For example, such friction type coverings may be of the sprayed-on rubber latex, or synthetic "plastic" type. However, it may be of any other suitable "sticky surfaced" type materials such as are presently available on the market. It is also to be understood that a single flat type endless belt or endless toothed belts (of the engine timing type) may be employed in lieu of gangs of "O" ring type belts such as are shown at 40 herein, if in any case such may be preferred.

In any case, the belt members of the oppositely disposed conveyor units 35,35 are thereby adapted to receive therebetween such articles from the input conveyor 54, and to frictionally grasp upon and carry them along in vertically suspended relation therebetween during the weight-taking operations. It is to be noted that the total of the weight comprising components of the machine which hang from the support structure constitutes the tare weight of the weight-measuring system. To this is to be momentarily added the weights of each such articles as they move in succession through the machine.

Whereas FIG. 1 illustrates the machine as being interposed between the article delivery conveyor 54 and a take-off conveyor 55, it is to be understood that it is equally well adapted to operate in conjunction with other forms of article input and take-away systems. For example, as shown at FIG. 2, the machine may be employed in conjunction with a single article conveying unit comprising an endless belt 76 which trains around a powered pulley 77 and an idler roller 78 with intermediate rollers 79,79 supporting therebetween the upper run of the conveyor belt 76 at a constant elevation under the machine. As shown in FIG. 3, another use of a single article intake and takeaway conveyor belt 80 arrangement may be employed, along with intermediate support rollers 82,82 and a depression roller 84. This arrangement provides further assurances of article clearances relative to the article support belt units 35,35 during the article weight-measuring operations.

In any such case, the machine 15 per se may preferably be carried by its support system so as to be upwardly inclined away from the article intake end thereof and toward the article take-away thereof. This would accommodate any inadvertent downward slippages of articles relative to the conveying belt units 35,35 while being weighed during transit through the weight-measuring components of the machine. Thus, as shown at FIGS. 1, 2 and 3, the machine may be mounted relative to its support frame so that the measurement designated "A" is greater than measurement "B". However, for handling exceptionally heavy articles, the invention further contemplates provision of a belt-slip safeguard slide platen or rail as shown at 90 (FIGS. 1, 3 and 4), such as may be carried on a crossbar 92 which is suspended at its opposite ends by brackets 94,94 from the stringer bars 30,30 (FIGS. 1, 2, 3, 4 and 6). In event of article slippages downwardly during their transit through the machine, they will nevertheless be carried along by the belt means in sliding relation on the slide plate or bar 90.

Accordingly, the machine of the invention operates during the weight-measuring process to carry the articles to be weighed therethrough with adequate clearances above any product spillages and/or debris such as typically accumulate on such article conveying belt systems. The machine incorporates such features in a structural assembly which per se is of improved compactness, whereby such machines of the invention are better adapted to be installed for improved operation in limited factory spaces, or the like.

What is claimed is:

1. A machine system for transporting and weighing or checkweighing articles passing in succession therethrough, such as for use in conjunction with weight-signal transmitting/converting/calculating printout devices or the like for visual display and price labeling operations or the like; said system comprising in combination:

article delivery and take-away means;

a weighing machine support device;

a weighing machine including a vertically flexible weight-measuring means attached to and suspended from said support device;

a truss type structure of inverted U-shaped sectional form attached to and suspended from said weight-measuring means and having oppositely disposed side wall portions thereof defining in aligned combination with said article delivery and take-away means an article-to-be-weighed passageway through said machine system;

oppositely paired article transport means carried upon said truss structure at opposite in-board side wall portions thereof for carrying therebetween articles to be weighed in vertically suspended succession through said passageway; and means powering said article transport means mounted upon said truss structure comprising a tare weight component of said weighing machine.

2. A machine system as set forth in claim 1 wherein said weight-measuring means comprises a load cell type transducer suspended from a portion of said machine support device.

3. A machine system as set forth in claim 2 wherein said article transport means each comprises endless belt means training about paired rollers located at opposite ends of said article-to-be-weighed passageway.

4. A machine system as set forth in claim 3 wherein said belt means are of article gripping surface form.

5. A machine system as set forth in claim 3 wherein said belt means are of longitudinally elastic form.

6. A machine system as set forth in claim 5 wherein said belt means incline upwardly from their article intake ends towards their article discharge ends.

7. A machine system as set forth in claim 1 wherein said article delivery and take-away means comprise separate article conveying devices arranged in longitudinally tandem and spaced apart relation so as to define an open space below said weighing machine throughout the article weight-taking range thereof.

8. A machine system as set forth in claim 7 wherein said truss type structure includes a bottom slide plate extending substantially throughout the longitudinal extent of said open space and in elevational continuity with the article support surfaces of said article delivery and take-away means.

9. A machine system as set forth in claim 1 wherein said article delivery and take-away means is of the single endless conveyor type.

10. A machine system as set forth in claim 9 wherein deflection means are provided to deflect the article conveying portion of said article delivery and take-away means downwardly below the level of the article delivery and take-away portions thereof in the region of said weighing machine to provide therebelow a vertically extended open space.

11. A machine system as set forth in claim 10 wherein said truss type structure includes a bottom slide plate extending substantially throughout the longitudinal extent of said open space and in elevational continuity with the article support surfaces of said article delivery and take-away means.

12. A machine for weighing articles passing in succession therethrough such as for use in conjunction with an article delivery and take-away means and weight-signal transmitting/converting/calculating printout devices for visual display and price labeling operations or the like; said machine comprising:

a machine support device;

a vertically flexible weight-measuring means suspended from said support device;

a truss structure suspended from said weight-measuring means and having side wall portions thereof defining in combination with an article delivery and take-away means an article-to-be-weighed passageway through said machine;

oppositely paired means carried by said truss structure for gripping therebetween and conveying articles in succession through said passageway; and means carried by said truss structure for powering said conveying means and comprising in combination therewith the tare weight component of said machine.

13. A machine as set forth in claim 12 wherein said weight-measuring means comprises a load cell type transducer suspended from said machine support device.

14. A machine as set forth in claim 13 wherein said oppositely paired means comprises parallel running endless belt means.

15. A machine as set forth in claim 14 wherein said belt means are of article gripping surface form.

16. A machine as set forth in claim 14 wherein said belt means are of longitudinally elastic form.

17. A machine as set forth in claim 12 wherein said truss type structure includes a slide plate positioned below said weight-measuring means in elevational continuity with the article support surfaces of said article delivery and take-away means.

* * * * *